United States Patent
Dockery

(10) Patent No.: US 9,902,416 B1
(45) Date of Patent: Feb. 27, 2018

(54) SPORTS EQUIPMENT UTILITY CART ASSEMBLY

(71) Applicant: Greg Dockery, Fresno, CA (US)

(72) Inventor: Greg Dockery, Fresno, CA (US)

( * ) Notice: Subject to any disclaimer, the term of this patent is extended or adjusted under 35 U.S.C. 154(b) by 0 days.

(21) Appl. No.: 15/351,103

(22) Filed: Nov. 14, 2016

(51) Int. Cl.
*B62B 3/10* (2006.01)
*B62B 3/00* (2006.01)
*B62B 5/06* (2006.01)
*A63B 71/00* (2006.01)

(52) U.S. Cl.
CPC ............ *B62B 3/10* (2013.01); *A63B 71/0036* (2013.01); *B62B 3/005* (2013.01); *B62B 3/102* (2013.01); *B62B 3/104* (2013.01); *B62B 5/06* (2013.01); *B62B 2202/40* (2013.01); *B62B 2301/04* (2013.01); *B62B 2501/02* (2013.01)

(58) Field of Classification Search
CPC  B62B 3/10; B62B 3/005; B62B 3/102; B62B 3/104; B62B 5/06; B62B 2205/40
See application file for complete search history.

(56) References Cited

U.S. PATENT DOCUMENTS

| | | | |
|---|---|---|---|
| 3,010,775 A | 11/1961 | Giovannelli | |
| 3,162,462 A * | 12/1964 | Elders | A47L 13/512 211/181.1 |
| 4,109,926 A * | 8/1978 | Lane | B62B 3/002 280/39 |
| 4,880,248 A * | 11/1989 | Elmer | B25H 5/00 108/64 |
| 5,249,823 A * | 10/1993 | McCoy | B62B 3/02 280/144 |
| 5,351,976 A * | 10/1994 | Penson | B62B 3/10 280/47.35 |
| 5,876,047 A * | 3/1999 | Dennis | B62B 3/007 280/47.35 |
| 5,906,383 A * | 5/1999 | Cortes | B62B 3/027 280/47.371 |
| 6,047,866 A | 4/2000 | Brown | |
| 6,194,468 B1 * | 2/2001 | Hattori | A61K 8/34 514/307 |
| 6,220,610 B1 | 4/2001 | Cox | |
| 6,550,791 B2 * | 4/2003 | Ramsey | A01K 97/22 280/47.19 |
| 6,663,139 B1 * | 12/2003 | Smith | B62B 3/002 280/651 |
| 6,830,253 B1 | 12/2004 | Porras, III et al. | |
| 6,851,563 B1 | 2/2005 | Lipari | |
| 7,097,182 B1 * | 8/2006 | Liu | B62B 3/02 280/42 |

(Continued)

*Primary Examiner* — Hau V Phan

(57) ABSTRACT

A sports equipment utility cart assembly includes a frame with a rectangular shape and a bottom wall is attached to the frame. A plurality of vertical members is attached to and extends upwardly from the frame. A plurality of horizontally oriented rails is attached to and extends between adjacent ones of the vertical members. The rails include a plurality of apex rails extending between upper ends of the vertical members. A support is attached the frame and extends above apex rails. A pair of hoops is provided and each of the hoops is attached to the support and each extends over one of the apex rails. The hoops receive an insulated water container. A plurality of wheels is attached to the frame and extends downwardly therefrom. A handle is attached to the frame and extends away therefrom.

9 Claims, 5 Drawing Sheets

(56) References Cited

U.S. PATENT DOCUMENTS

| | | | |
|---|---|---|---|
| 7,144,020 B2* | 12/2006 | Huguet | A47B 95/043 280/47.34 |
| D661,451 S * | 6/2012 | Armstrong, Sr. | D34/17 |
| 8,602,425 B1 | 12/2013 | Meier, III et al. | |
| 8,746,377 B1* | 6/2014 | Dunbar | B62B 5/0003 180/19.2 |
| 8,973,940 B2* | 3/2015 | Chen | B62B 3/02 280/35 |
| D729,987 S | 5/2015 | Holm et al. | |
| 2002/0070517 A1* | 6/2002 | Ramsey | A01K 97/22 280/47.19 |
| 2011/0025005 A1* | 2/2011 | Howell | B62B 3/007 280/47.24 |

* cited by examiner

SPORTS EQUIPMENT UTILITY CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cart devices and more particularly pertains to a new cart device for transporting articles for sporting activities and in particular for holding and moving containers containing fluids.

BRIEF SUMMARY OF THE INVENTION

An embodiment of the disclosure meets the needs presented above by generally comprising a frame with a rectangular shape and a bottom wall is attached to the frame. A plurality of vertical members is attached to and extends upwardly from the frame. A plurality of horizontally oriented rails is attached to and extends between adjacent ones of the vertical members such that each of the vertical members has a plurality of the rails attached thereto. The rails include a plurality of apex rails extending between upper ends of the vertical members. A support is attached to and extends upwardly from the frame. The support extends above apex rails. A pair of hoops is provided and each of the hoops is attached to the support and each extends over one of the apex rails. The hoops are configured to receive an insulated water container such that the insulated water container rests upon an associated one of the apex rails. A plurality of wheels is attached to the frame and extends downwardly therefrom. Each of the wheels is rotatable with respect to the frame. A handle is attached to the frame and extends away therefrom.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
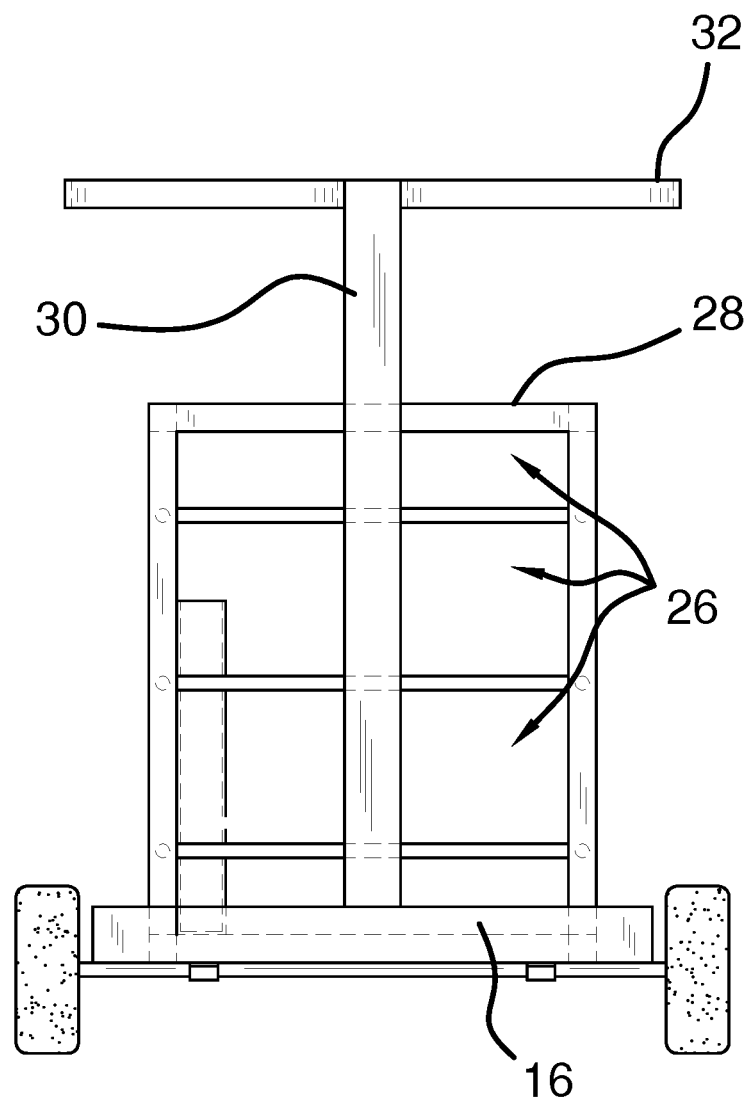
FIG. 1 is a rear view of a sports equipment utility cart assembly according to an embodiment of the disclosure.
Figure 2:
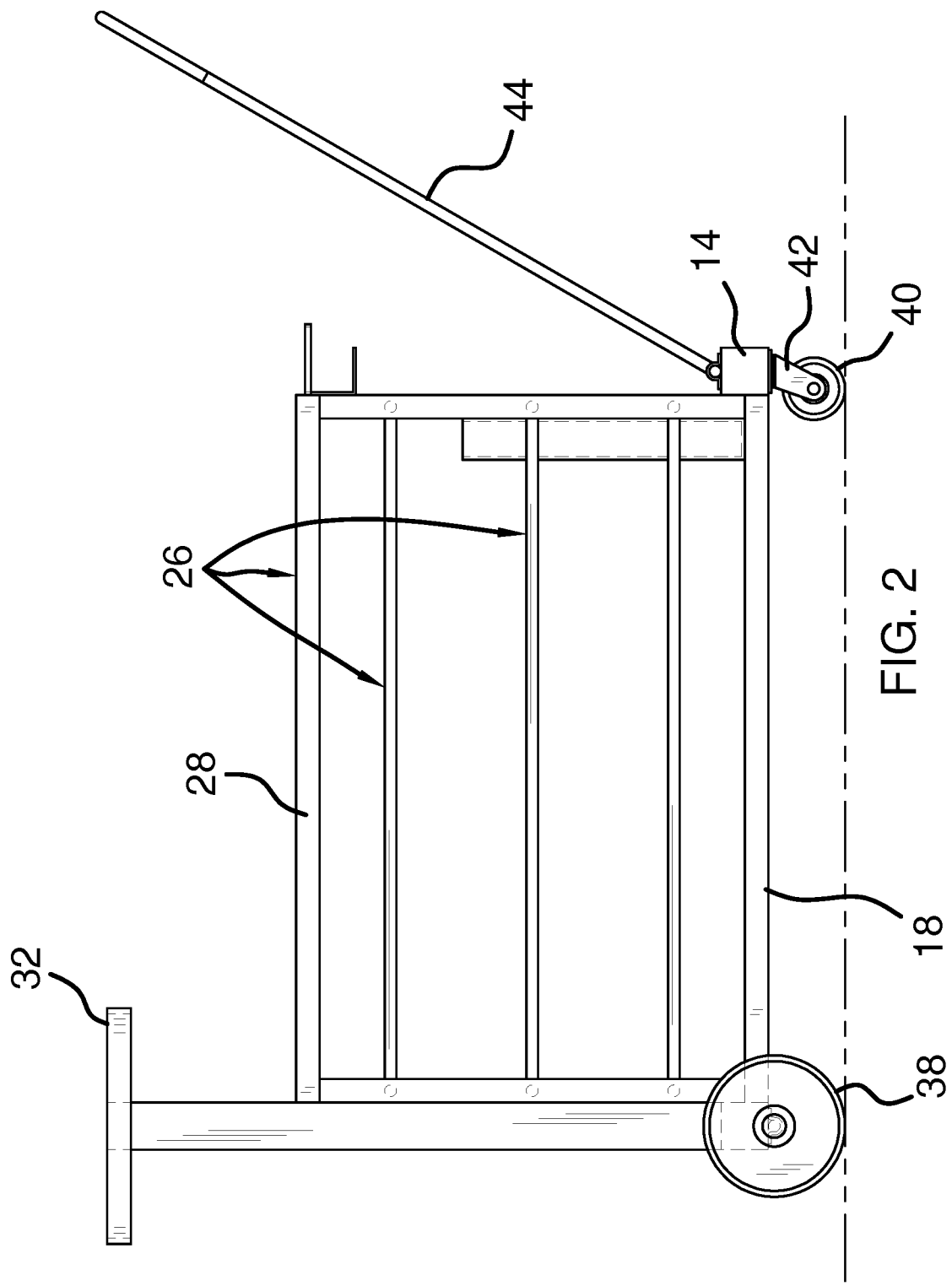
FIG. 2 is a side view of an embodiment of the disclosure.
Figure 3:
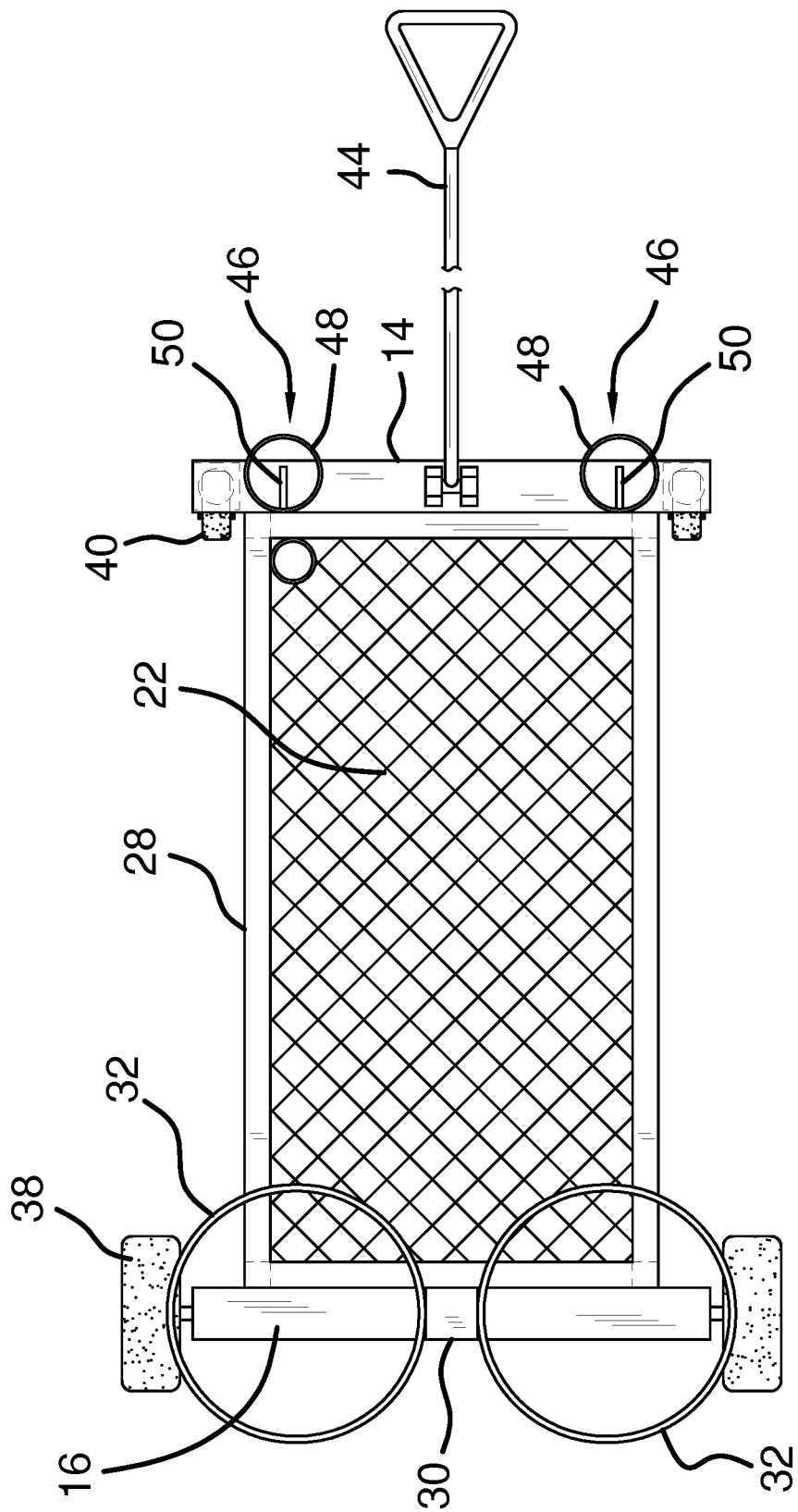
FIG. 3 is a top view of an embodiment of the disclosure.
Figure 4:
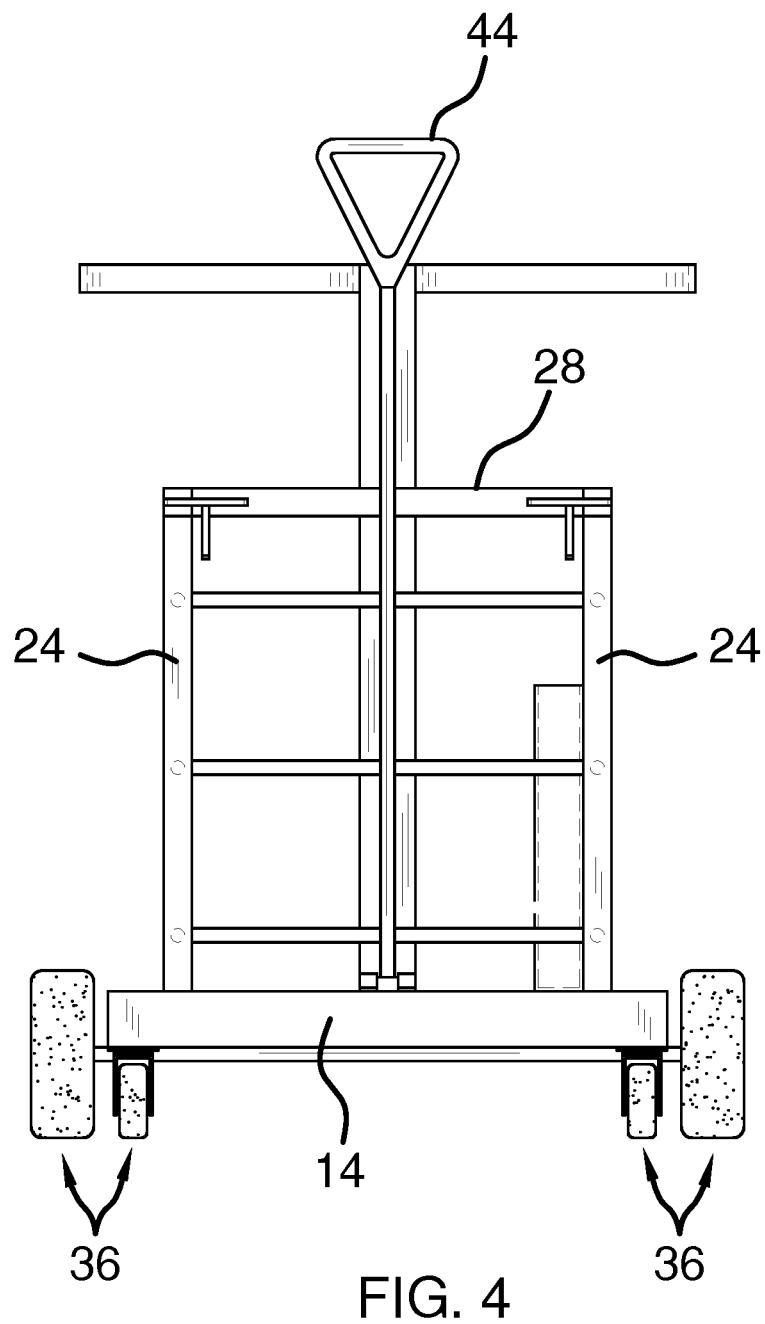
FIG. 4 is a front view of an embodiment of the disclosure.
Figure 5:
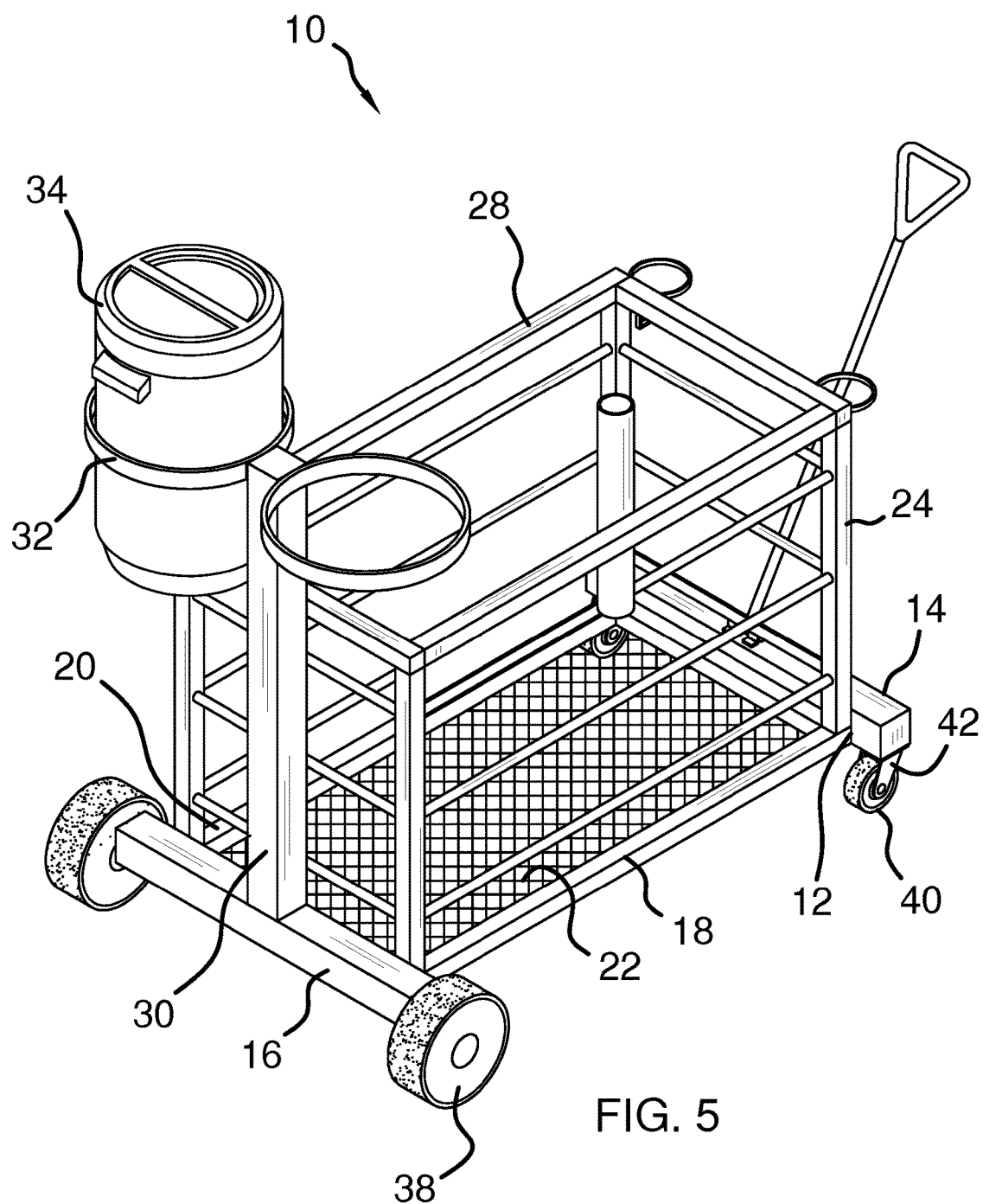
FIG. 5 is an in-use rear perspective view of an embodiment of the disclosure.

With reference now to the drawings, and in particular to FIGS. 1 through 5 thereof, a new cart device embodying the principles and concepts of an embodiment of the disclosure and generally designated by the reference numeral 10 will be described.

As best illustrated in FIGS. 1 through 5, the sports equipment utility cart assembly 10 generally comprises a frame 12 that has a rectangular shape and comprises a front member 14, a rear member 16, a first lateral member 18 and a second lateral member 20. The frame 12 is elongated from the front member 14 to the rear member 16 and is comprised of a rigid material such as a metal or plastic. The frame 12 has a length between 28.0 inches and 36.0 inches and a width between 18.0 inches and 26.0 inches. A bottom wall 22 is attached to the frame 12 and may comprise a mesh material to allow fluids to flow the bottom wall 12.

A plurality of vertical members 24 is attached to and extends upwardly from the frame 12. A plurality of rails 26 each is horizontally oriented and the rails 26 are attached to and extend between adjacent ones of the vertical members 24. Each of the vertical members 24 has a plurality of the rails 26 attached thereto. The rails 26 include a subset group defining a plurality of apex rails 28 extending between upper ends of the vertical members 24 and being distal to the bottom wall 22. The apex rails 28 define an access opening in a housing being bounded by the frame 12, vertical members 24 and the rails 26. The vertical members 24 each have a height between 18.0 inches and 26.0 inches.

A support 30 is attached to and extends upwardly from the frame 12 and further support extends above apex rails 28 a distance of between 4.0 inches and 16.0 inches. The support 30 may be attached to the rear member 16. A pair of hoops 32 is provided and each of the hoops 32 is attached to the support 30. As can be seen in the Figures, the hoops 32 may be positioned on opposite sides of the support 30. Each of the hoops 32 extends over one of the apex rails 28. The hoops 32 are configured to receive an insulated water container 34 such that the insulated water container 34 rests upon an associated one of the apex rails 28. Each of the hoops 32 may have a diameter between 7.0 inches and 12.0 inches.

A plurality of wheels 36 is attached to the frame 12 and extends downwardly therefrom. Each of the wheels 36 is rotatable with respect to the frame 12. The wheels 36 include two rear wheels 38 attached to the rear member 16 and two front wheels 40 attached to the front member 14. The front wheels 40 are attached to swivels 42 to allow a direction of rotation of the front wheels 40 to be turned. A handle 44 is attached to the frame 44 and extends away therefrom. The handle 44 is attached to the front member 14 and may be pivotable with respect to the frame 12.

In use, the assembly 10 is used in a conventional manner of a cart to hold a plurality of articles and transport the same. However, the assembly 10 is particularly well suited for transporting articles used during sporting events and practices to provide players with equipment and fluids. Thus, the assembly 10 includes loops 32 configured for holding fluid containers 34. Additionally, cup holders 46 may be mounted on the apex rails 28, or other locations, to hold drinking containers having fluids therein. The cup holder 44 may generally include a small hoop 48 having a diameter less than 4 inches positioned above a platform 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cart assembly configured for holding sports equipment, said cart assembly comprising:
    a frame having a rectangular shape;
    a bottom wall being attached to said frame;
    a plurality of vertical members being attached to and extending upwardly from said frame;
    a plurality of rails each being horizontally oriented, said plurality of rails being attached to and extending between adjacent ones of said vertical members, said plurality of rails including a plurality of apex rails extending between upper ends of said vertical members;
    a support being attached to and extending upwardly from said frame, said support extending above apex rails;
    a pair of hoops, each of said hoops being attached to said support, each of said hoops extending over one of said apex rails such that each said hoop is vertically positioned above and extending over said one of said apex rails, each of said hoops being configured to receive an insulated water container such that the insulated water container rests upon an associated one of said apex rails;
    a plurality of wheels being attached to said frame and extending downwardly therefrom, each of said wheels being rotatable with respect to said frame; and
    a handle being attached to said frame and extending away therefrom.

2. The cart assembly according to claim 1, wherein said frame includes a front member, a rear member, a first lateral member and a second lateral member, said frame being elongated from said front member to said rear member.

3. The cart assembly according to claim 2, wherein said frame has a length between 28.0 inches and 36.0 inches and a width between 18.0 inches and 26.0 inches.

4. The cart assembly according to claim 3, wherein said vertical members each have a height between 18.0 inches and 26.0 inches.

5. The cart assembly according to claim 2, wherein said wheels include two rear wheels attached to said rear member and two front wheels attached to said front member, said rear wheels being positioned in vertical alignment with said hoops, said front wheels being attached to swivels to allow a direction of rotation of said front wheels to be turned, said handle being attached to said front member.

6. The cart assembly according to claim 2, wherein said handle is pivotable with respect to said frame.

7. The cart assembly according to claim 1, wherein said bottom wall comprises a mesh material.

8. The cart assembly according to claim 1, wherein each of said hoops has a diameter between 7.0 inches and 12.0 inches.

9. A cart assembly configured for holding sports equipment, said cart assembly comprising:
    a frame having a rectangular shape and comprising a front member, a rear member, a first lateral member and a second lateral member, said frame being elongated from said front member to said rear member, said frame having a length between 28.0 inches and 36.0 inches and a width between 18.0 inches and 26.0 inches;
    a bottom wall being attached to said frame, said bottom wall comprising a mesh material;
    a plurality of vertical members being attached to and extending upwardly from said frame;
    a plurality of rails each being horizontally oriented, said plurality of rails being attached to and extending between adjacent ones of said vertical members, said plurality of rails including a plurality of apex rails extending between upper ends of said vertical members, said vertical members each having a height between 18.0 inches and 26.0 inches;
    a support being attached to and extending upwardly from said frame, said support extending above apex rails, said support being attached to said rear member;
    a pair of hoops, each of said hoops being attached to said support, each of said hoops extending over one of said apex rails such that each said hoop is vertically positioned above and extending over said one of said apex rails, each of said hoops being configured to receive an insulated water container such that the insulated water container rests upon an associated one of said apex rails, each of said hoops having a diameter between 7.0 inches and 12.0 inches;
    a plurality of wheels being attached to said frame and extending downwardly therefrom, each of said wheels being rotatable with respect to said frame, said wheels including two rear wheels attached to said rear member and two front wheels attached to said front member, said rear wheels being positioned in vertical alignment with said hoops, said front wheels being attached to swivels to allow a direction of rotation of said front wheels to be turned; and a handle being attached to said frame and extending away therefrom, said handle being attached to said front member, said handle being pivotable with respect to said frame.

\* \* \* \* \*